March 20, 1934.  B. J. SWANSON  1,951,583
MIRROR SUPPORT
Filed Oct. 30, 1933
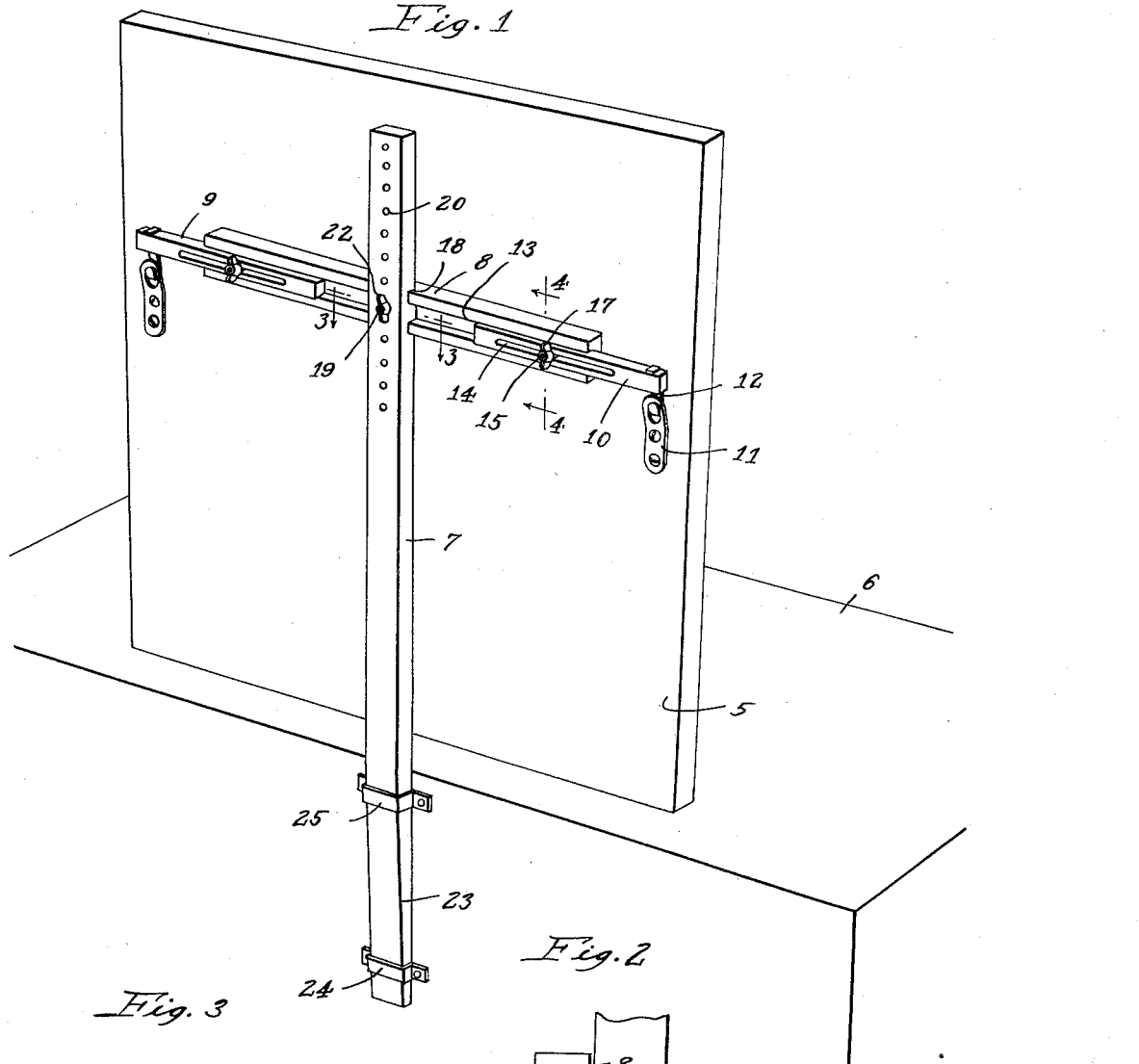
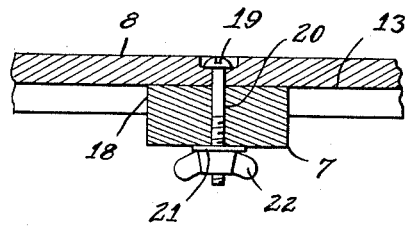
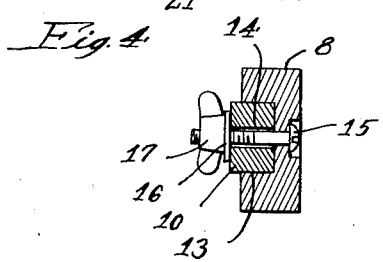
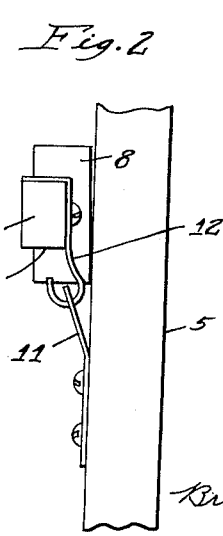
Inventor:
Bror J. Swanson
By Wilson, Dawell, McCanna & Wintercorn
Attys.

Patented Mar. 20, 1934

1,951,583

UNITED STATES PATENT OFFICE 1,951,583

MIRROR SUPPORT

Bror J. Swanson, Rockford, Ill., assignor, by mesne assignments, to Landstrom Furniture Corporation, Rockford, Ill., a corporation of Illinois Application October 30, 1933, Serial No. 695,825

4 Claims. (Cl. 45—88)

This invention relates to a new and improved mirror support for use on dressers and vanities or dressing tables.

Hanging mirrors of the kind used with dressers have been made for fastening to the wall behind the piece. It has therefore been difficult to arrange window displays, and in many cases floor displays were also unhandy to arrange because of the necessity of placing the dresser or other piece where the mirror could be hung on the wall behind it. The principal object of my invention is to provide a support which may be quickly and easily mounted directly on the back of the dresser and will support the mirror so securely that the piece may be moved around without endangering the mirror Another important object is to provide a mirror support that is adjustable quickly and easily to suit different heights and widths of mirrors from the smallest to the largest in the generally accepted range of standard sizes.

Another object is to provide a device of this kind which is so constructed that it may be reduced to a small sized package and be stowed away in the dresser drawer in shipment.

Reference is made in the following description to the accompanying drawing, in which—

Figure 1 is a perspective view of the back of a dresser showing the mirror support of my invention;

Fig. 2 is a fragmentary side elevation of the support showing how the mirror is hung thereon, and Figs. 3 and 4 are sectional details taken on the correspondingly numbered lines of Figure 1.

The same reference numerals are applied to corresponding parts throughout the views.

The mirror to be supported is indicated at 5 behind and above the dresser 6. The mirror support is made up of a standard 7, crossbar 8 adjustable to different positions up or down on the standard, and two slides 9 and 10 adjustable in and out on the crossbar 8, whereby to suit different heights and widths of mirrors. Each mirror comes equipped with eyelets 11 suitably secured to the back thereof a trifle above the middle. Hooks 12 secured on the outer ends of the slides 9 and 10 so as to face rearwardly, that is, away from the back of the mirror, are entered in the eyelets for suspension of the mirror. Viewing Fig. 2, it is apparent that since the slides are on the back of the crossbar 8 which has abutment with the back of the mirror, the eyelets 11 cannot become disengaged from the hooks accidentally once the mirror is hung thereon, especially since disengagement of the eyelets would necessitate turning the mirror in a clockwise direction on the hooks 12 as a center, and such movement is out of the question because of the engagement of the lower end of the mirror with the standard 7, as appears in Figure 1. Once the mirror is hung on a piece of furniture, there is, therefore, no danger of its coming off, and the piece can be moved around without the exercise of more than ordinary care. The mirror is, of course, tilted to the slight extent permitted by the way the same is hung on the support.

The crossbar 8 is grooved lengthwise as at 13 to receive the slides 9 and 10 with a close working fit. Slots 14 extending lengthwise in the slides receive the bolts 15 that are passed through the crossbar and slides to fasten the slides in adjusted position. Washers 16 and wing nuts 17 are provided on the projecting ends of the bolts 15, and when the wing nuts are tightened, the slides are clamped in adjusted position. It is only necessary to loosen the nut to move the slide one way or the other as dictated by the width of the mirror to be supported.

Another groove 18 is provided in the crossbar 8 at the middle thereof crosswise with respect to the longitudinal groove 13, and this groove receives the standard 7 with a close working fit. This permits one to slide the crossbar 8 up or down on the standard as required for different heights of mirrors, while maintaining the crossbar in right angled relation to the standard in any position and permitting it to be fastened rigidly in adjusted position, using only one bolt. A bolt 19 is passed through the crossbar 8 and through whichever one of the series of holes 20 comes into register, depending on the position of the crossbar, the holes 20 being drilled at points spaced lengthwise, that is, vertically of the standard. A washer 21 and wing nut 22 are provided on the projecting end of the bolt 19 and when the nut is tightened, the crossbar is secured in adjusted position.

The lower end of the standard is tapered as appears at 23 so as to wedgingly engage in the cleats or straps 24 and 25 fastened on the back of the dresser. In this way the assembly of mirror and mirror support is kept in proper relation to the dresser or other piece of furniture fitted therewith. The mirror is usually supported so that the bottom is slightly off the dresser top. This does not leave enough of the standard 7 exposed to be noticeable, or, at any rate, objectionable.

It should be clear from the foregoing description that I have provided a mirror support presenting many important advantages over anything available heretofore for a similar purpose. In the shipment of the piece of furniture the crossbar 8 with its slides 9 and 10 is laid in one of the drawers along with the standard 7. Then when the mirror is to be hung the standard is set in the socket cleats provided therefor, and the crossbar 8 is attached to the back of the mirror, with the slides 9 and 10 properly adjusted according to the width of mirror, whereupon the slide is then fastened to the standard using the proper hole 20, according to the height of the mirror. The slots 14 in the slides are long enough to provide a large range of adjustment of the slides for different widths of mirrors, and there are enough holes 20 provided in the standard 7 to provide a large range of adjustment for the crossbar 8 to take care of different heights of mirrors. The parts used in the mirror support are manifestly of the most economical construction while still affording the requisite range of adjustment and the necessary strength, rigidity and durability.

It is believed the foregoing description conveys a good understanding of all of the advantages and objects of my invention. The appended claims have been drawn with a view to covering all legitimate modifications and adaptations.

I claim:

1. A device of the class described comprising a substantially vertical standard supported on a piece of furniture, a crossbar having a vertical groove provided thereon transversely of the back thereof receiving the standard with a close working fit, whereby to permit adjusting the crossbar to different positions up or down on the standard, the standard having a plurality of vertically spaced holes provided therein adapted to selectively receive a fastening bolt for securing the crossbar in adjusted position, and a pair of slides movable laterally relative to the standard in longitudinal grooves provided therefor in the crossbar, the latter being adapted to support a mirror on the outer ends thereof in front of the standard and crossbar.

2. A device of the class described comprising a substantially vertical standard supported on a piece of furniture, a crossbar having a vertical groove provided thereon transversely of the back thereof receiving the standard with a close working fit, whereby to permit adjusting the crossbar to different positions up or down on the standard, the standard having a plurality of vertically spaced holes provided therein adapted to selectively receive a fastening bolt for securing the crossbar in adjusted position, a pair of slides received with a working fit in longitudinal grooves provided in said crossbar whereby to permit adjustment of the slides laterally with respect to the standard to bring mirror supporting members on the outer ends of said slides in different laterally spaced relation, said slides each having a longitudinal slot provided therein, and a fastening bolt for each slide extending through the crossbar and through the slot in the slide for fastening the slide in adjusted position on the crossbar.

3. An adjustable support of the character described comprising a standard having a plurality of vertically spaced holes provided therein, a crossbar slidable on the standard to different positions and having a fastening bolt arranged to be entered selectively in any one of said holes to fasten the crossbar to the standard in adjusted position, and a pair of slides extensible from the ends of the crossbar and having means for fastening the same in adjusted position on the crossbar, the slides having means at the outer ends thereof for supporting a mirror or other object on the crossbar.

4. The combination of a mirror having rearwardly projecting eyelets on the back thereof at opposite sides, for support thereof, and a mirror support including a crossbar having rearwardly facing hooks on the outer ends thereof entered in said eyelets, the mirror being thereby suspended with its back in engagement with the crossbar, said mirror being removable from the hooks only by tilting forwardly to an extreme angle relative to the crossbar, and an upright supporting the crossbar and engaging the back of the mirror at the bottom to support it in a slightly tilted position suitable for use of the mirror on a piece of furniture.

BROR J. SWANSON.